No. 636,143. Patented Oct. 31, 1899.
P. B. HORNER & C. E. HEDRICK.
CORN HARVESTER.
(Application filed June 28, 1898.)
(No Model.) 2 Sheets—Sheet 1.
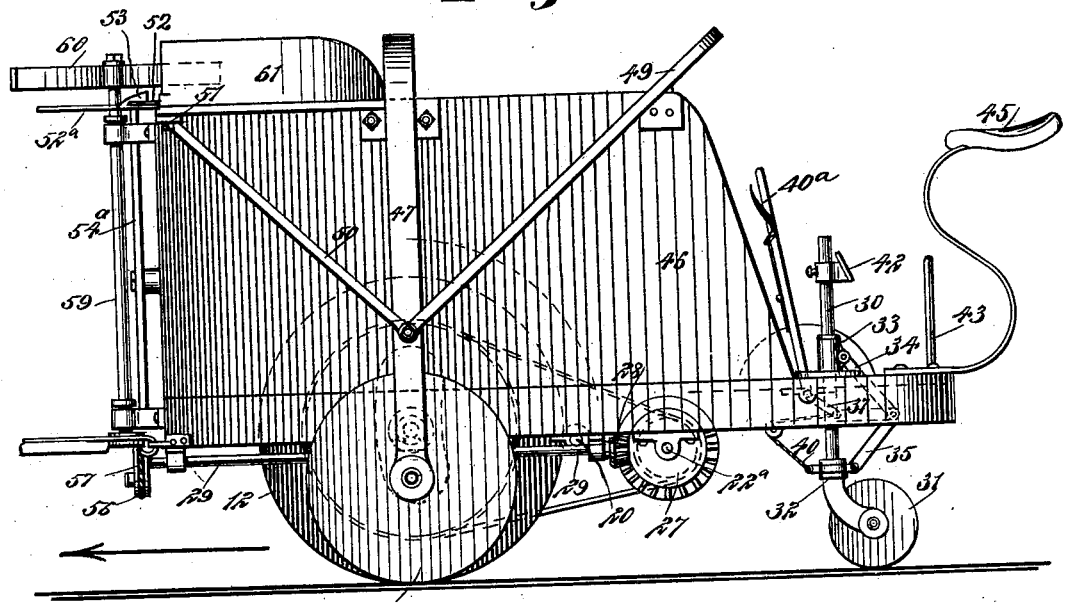
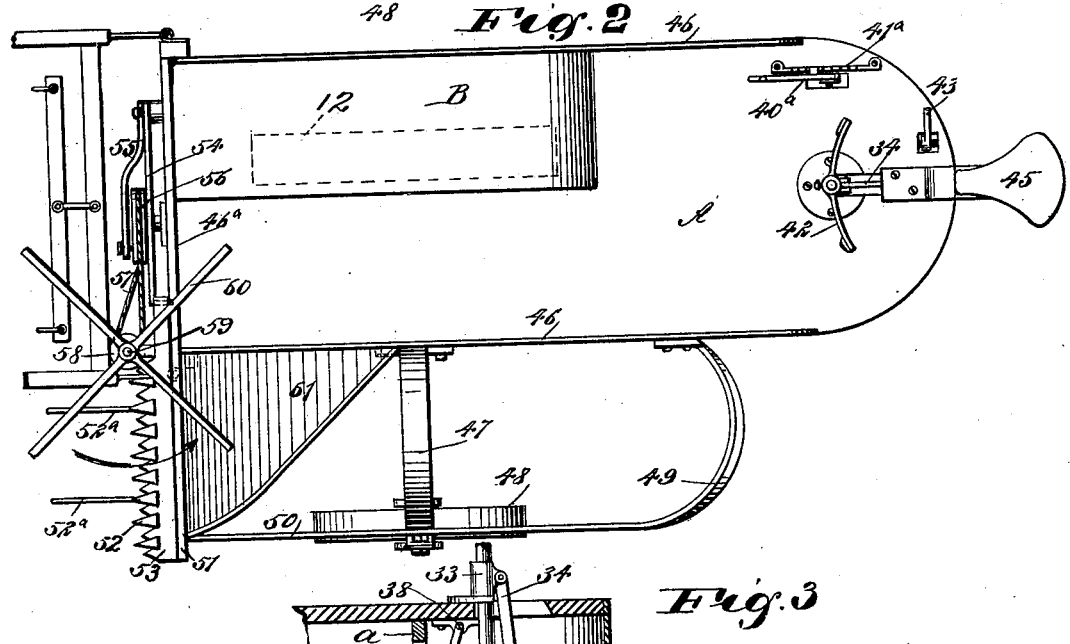
WITNESSES:
INVENTORS
P. B. Horner.
C. E. Hedrick.
BY
ATTORNEYS.

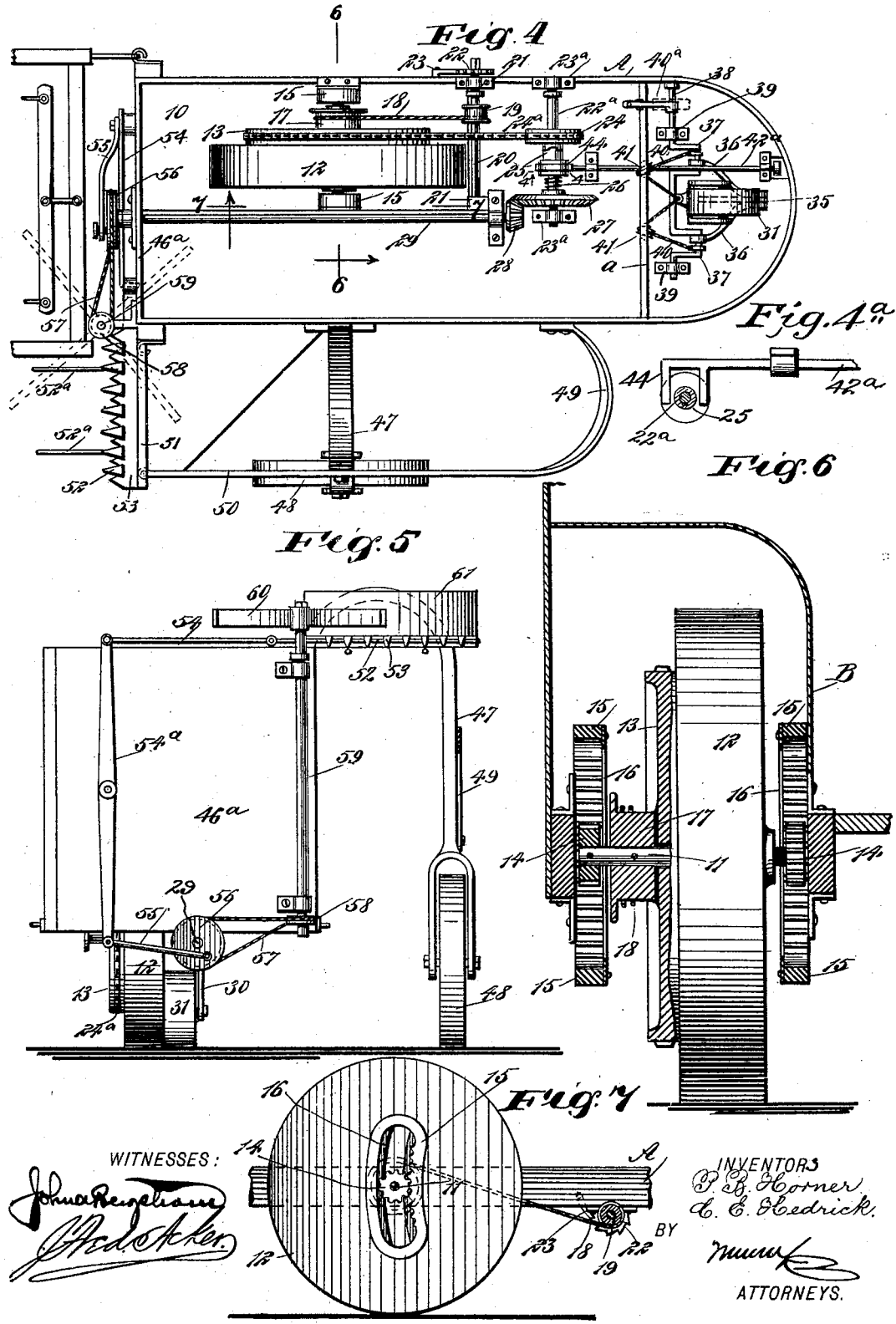

UNITED STATES PATENT OFFICE.

PAOLI BYRON HORNER AND CLARENCE ELLIOTT HEDRICK, OF CLEMENTS, KANSAS.

CORN-HARVESTER.

SPECIFICATION forming part of Letters Patent No. 636,143, dated October 31, 1899.

Application filed June 28, 1898. Serial No. 684,660. (No model.)

*To all whom it may concern:*

Be it known that we, PAOLI BYRON HORNER and CLARENCE ELLIOTT HEDRICK, of Clements, in the county of Chase and State of Kansas, have invented a new and Improved Corn-Harvester, of which the following is a full, clear, and exact description.

Our invention relates particularly to a device for topping Kafir corn and similar stalks.

The object of the invention is to furnish a simple and economic machine capable of adjustment for cutting tall or short stalks and likewise capable of being worked by a single horse with one attendant.

A further object of the invention is to provide a means whereby when the machine is in operation the cutter may be elevated or depressed to effectually top stalks of unequal height.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the machine. Fig. 2 is a plan view. Fig. 3 is a detail sectional view taken through the rear portion of the platform or deck of the machine, illustrating the guide-wheel in side elevation and the devices employed for raising and lowering the wheel. Fig. 4 is a plan view of the machine with the box and platform removed. Fig. $4^a$ is a sectional detail on line 4 4 of Fig. 4. Fig. 5 is a front end view of the machine. Fig. 6 is a transverse section taken substantially on the line 6 6 of Fig. 4, and Fig. 7 is a detail sectional view taken substantially on the line 7 7 of Fig. 4.

The machine is adapted to travel between the rows of standing stalks and to cut the heads therefrom, leaving the fodder standing until it matures. Kafir corn averages about four and one-half feet in height. The great difficulty in the harvesting of Kafir corn is that the heads ripen long before the fodder is ready to harvest, and if the heads are left upon the stalks until the fodder is fit for cutting, the seed shells off and is wasted when the fodder is gathered; or should the fodder be cut at the time the seed ripens, the fodder will mold in the stacks. Our machine is adapted to gather the heads at proper time, leaving the stalks to mature.

The frame A of the machine consists of parallel sides, a front section connecting the sides, and a rear bow-section, the frame being braced near the rear by a cross-bar $a$, and other cross-bars and longitudinal timbers may be employed, if desired. The top of the frame is decked over or closed in any suitable or approved manner except at one side, where an opening 10 is formed, extending from a point near the rear to the front, the said opening being covered by a housing B, secured to the upper face of the deck of the frame.

At or about the central portion of the opening 10 a shaft 11 is transversely located, and on the said shaft a master-wheel 12, which is also a supporting-wheel, is loosely mounted through the medium of a sleeve or otherwise, and a sprocket-wheel 13 is attached to the master-wheel. At each end of the shaft 11 a pinion 14 is secured. These pinions are arranged to travel in loop-bearings 15, one of the inner vertical edges of each bearing being provided with teeth, as shown in Fig. 7, and each loop-bearing is also provided upon its inner face with a guide 16, so that the pinions cannot leave the bearings. The bearings 15 are secured one to the frame and the other to the inner longitudinal wall of the opening 10 in the deck of the machine.

A drum 17 is secured upon the shaft 11, and when the said drum is revolved the shaft is rotated, and consequently the framework of the machine will be raised or lowered, according to the direction in which the shaft 11 is turned. A cable 18 is secured to the drum 17 and to a second drum 19, which is attached to a shaft 20, journaled in suitable bearings 21 at the rear end of the opening 10, the shaft 20 being so shaped at its outer end as to receive a crank-key or its equivalent, and the outer end of the shaft 20 is also provided with a ratchet-wheel 22, normally engaged by a pawl 23.

A shaft $22^a$ is journaled in bearings $23^a$ on the bottom of the frame at the rear of the shaft 20, and the shaft $22^a$ has loosely mounted thereon a sprocket-wheel 24, connected by a belt $24^a$ with the larger sprocket-wheel 13 on the main shaft 11. The sprocket-wheel 24 is provided with a clutch-face which is adapted to normally engage with a clutch 25, held to slide upon and turn with the shaft $22^a$, the clutch 25 being held in engagement with the sprocket-wheel 24 by a spring 26 or like tension device. A beveled wheel 27 is secured on the shaft $22^a$ near its inner end, and the said beveled wheel is engaged with a beveled pinion 28, mounted on the inner end of a longitudinal shaft 29, held to turn in suitable bearings, which shaft is carried out through the forward end of the frame.

At the rear end of the frame a bearing 33 is provided, in which a stem 30 is mounted to turn and to have vertical movement, the said stem carrying at its lower end a steering-wheel 31, which may be termed a "swivel-wheel." A collar 32 is loosely mounted upon the lower end of the stem, yet is held against vertical movement, and a strap is carried around the said collar, as shown in Fig. 3. A link 34 is secured to the bearing 33 at the rear, which link extends downward through the opening in the deck of the machine and is pivoted to a second link 35, which is pivotally attached to the strap on the lower collar 32.

Two horizontal opposing arms 36 are attached to the pivot connecting the links 34 and 35, one of said arms being at each side of the said links, and the arms 36 are pivotally connected with cranks 37, formed upon a crank-shaft 38, suitably journaled at the bottom of the frame near the rear, the bearings of the said crank-shaft being designated as 39. A cable 40 is passed through an eye in the strap carried by the sleeve 32, and this cable is passed over friction-rollers 41, mounted in the cross-bar $a$ or a like support, and an end of the cable is attached to each of the cranks 37, as shown in Fig. 4.

A lever $40^a$ is secured to the shaft 38 and extends up through an opening in the deck, as shown in Fig. 2, the lever being provided with a suitable thumb-latch for engagement with a rack $41^a$. By the manipulation of the lever $40^a$ the swivel steering-wheel may be raised or lowered, so as to elevate or depress the forward end of the machine. When crank-shaft 38 is rocked by lever $40^a$ so as to throw arm 36 to the right, Fig. 3, the links 34 35 act like toggle-arms to draw up collar 32, and the same movement causes a pull on the cable 40 to equalize the lifting strain on collar 32. The steering-wheel is manipulated for steering purposes by attaching a foot-bar 42 to the upper end of the stem 30, as is best shown in Fig. 2. Under such a construction the machine may be guided during operation, leaving the hands of the driver free to manipulate levers or to drive a horse.

The driving-pulley 24 or the driving-shaft $22^a$ may be brought in engagement with the clutch 25 or carried out of engagement therewith through the medium of a shaft $42^a$, which is provided with a hand-lever 43, extending above the deck of the machine near the rear, the forward end of the shaft $42^a$ being carried downward and provided with an attached shifting-fork 44, arranged for the usual engagement with the clutch 25. (See Fig. $4^a$.) As the shaft $42^a$ extends longitudinally and horizontally beneath the deck of the machine and the fork 44 extends vertically downward from the shaft, when the shaft is rocked through the medium of the lever 43 the fork is given lateral movement to shift the clutch 25.

The deck of the machine is provided with two upright side pieces 46 and a front upright section $46^a$, forming a box which is adapted to receive the harvested tops. An arched pedestal 47 is carried outwardly from the left-hand side of the machine and downwardly in direction of the ground, and the said pedestal is adapted as a bearing for the trunnions of a supporting-wheel 48, which is opposite the master-wheel 12. The pedestal 47 is braced by a bar 49, carried from a point near its lower end to the rear of the left-hand upright section of the deck, and by a second bar 50, carried from a like point on the pedestal to a cross-bar 51, which extends along the upper portion of the front of the machine and outwardly beyond the left-hand side of the same. The driver's seat 45 is located just back of the foot-bar 42 on the stem of the swivel steering-wheel 31.

At the left-hand side of the machine a finger-bar 52 is secured upon the upper cross-bar 51, and on the said finger-bar a sickle-bar 53 is mounted to slide, while guides $52^a$ extend out from the finger-bar, near the ends thereof, and in a forwardly direction, so as to direct the tops of the corn to the cutters. A link 54 is attached to the inner end of the sickle-bar 53, and the said link, which is horizontally disposed, is attached to a lever $54^a$, fulcrumed at its center to the front of the machine, the lever being vertically disposed, and the lower end of the lever 54 is connected by a link 55 with a wrist-pin on a crank-disk 56, the said crank-disk being secured to the shaft 29. The crank-disk may be grooved to constitute a pulley or may have a pulley attached, and a belt 57 is carried over the crank-disk, or an attached pulley when one is employed, and around a small pulley 58, secured to the lower end of a vertical shaft 59, which shaft extends to the upper portion of the machine, and at its upper end is provided with a reel 60, which is adapted to direct the tops into the space between the guides $52^a$.

At the rear of the cutters a table 61 is secured to the machine, which serves to direct the tops as cut into the body portion of the machine or upon the deck. The machine is exceedingly simple, durable, and economic and well adapted for the purpose for which it is intended.

In operation the machine can be set to cut the tops at any height from the ground, the sickle or cutter being about three and one-half feet from the ground when the shaft 11 is at the center of the raising and lowering device or occupies the position shown in Fig. 7, and the raising and lowering device is preferably made so as to afford a variation in the adjustment of the frame of at least one foot higher or lower than the mean height of three and one-half feet. While the machine is in operation, by raising and lowering the stem of the swivel steering-wheel the front of the machine, and consequently the sickle or cutter bar, may be raised or lowered, so as to effectually cut the tops of the stalks that may be above or below the height to which the machine was adjusted.

With this machine it will be seen that the team (a single horse) is attached to the singletree in front of the box-frame A, whose general appearance is that of a Roman chariot closed at the front and sides and open at the top and rear. The sickle and finger bars are at the upper edge of the box-casing and offset to one side of the same, and the elevated table 61 receives the heads of grain as they are cut off and directs them laterally into the receptacle formed by the box-casing.

Having thus described our invention, we claim as new and desire to secure by Letters Patent—

1. A machine for harvesting the tops of corn, comprising a box-casing closed in front and at its two sides, a finger-bar and sickle arranged on a level with the top of the box-casing but offset to one side of the same, a table-surface arranged in rear of the sickle and discharging laterally into the side of the box-casing, a master-wheel supporting one side of the machine and having a train of gearing extending to the elevated sickle-bar for operating it, and a second wheel and supporting-frame arranged on the other side of the box-casing, said frame consisting of a vertical pedestal 47 extending upwardly and curved inwardly to the box-casing, a brace 49 extending from the rear of the box-casing to the lower part of the pedestal, and a front inclined brace 50 extending from the pedestal to and supporting the outer end of the finger-bar and sickle, substantially as and for the purpose described.

2. A machine for harvesting the tops of corn, comprising a box-casing closed in front and at its two sides, a finger-bar and sickle arranged on a level with the top of the box-casing, but offset to one side of the same, a table-surface arranged in rear of the sickle and discharging into the side of the box-casing, a master-wheel supporting one side of the machine and having a train of gearing extending to the elevated sickle-bar for operating it, means for raising and lowering the axle of said master-wheel, a wheel and supporting-frame consisting of pedestal 47 and inclined braces 49 and 50 arranged on the other side of the box-casing, and supporting the outer end of the finger-bar and sickle, a trailing and swiveling guide-wheel arranged beneath the rear of the frame, and means for adjusting it vertically in relation to the main frame, substantially as and for the purpose described.

3. The combination with the main frame, of the stationary sleeve-bearing 33, a swiveling guide-wheel with vertical stem arranged therein, the toggle-links 34, 35 connected respectively to the stationary bearing 33 and to a collar around the stem of the guide-wheel, the crank-shaft 38, arms 36 connected to the crank-shaft and also to the middle toggle-joint, and a cable 40 connected at one end to the collar around the guide-wheel stem, and at the other end to the crank-shaft, to equalize the lifting strain on the guide-wheel and to permit it to be adjusted up and down and also about a vertical axis, substantially as described.

4. In a corn-harvester, the box-casing closed in front and on its two sides and having a hood B, a master-wheel arranged within said hood and having sprocket-wheel 13, chain belt 24ª extending rearwardly, cross-shaft 22ª with sprocket-wheel 24 arranged in rear of the master-wheel and having a clutch for coupling it to the shaft, a longitudinal shaft 29 arranged on the opposite side of the master-wheel from its sprocket, and connected to the cross-shaft by bevel-gear, and extending to the front of the machine and provided there with crank-pulley 56, the vertical lever 54ª, horizontal pitmen 54, 55, the horizontal cutter-bar arranged at the upper edge of the box-casing and offsetting to one side, a vertical shaft 59 with reel-arms at the top, and a belt for driving said shaft and reel from the crank-pulley 56, substantially as and for the purpose described.

5. The combination of the box-casing, and the cutter-bar arranged at the top of the same and projecting laterally from the same, a table 61 arranged in rear of said cutter-bar and opening laterally into the top of the box-casing, the pedestal 47 bearing a running wheel at its lower end and curving upwardly and inwardly to the box-casing, and the braces 49 and 50 connecting the pedestal of this wheel respectively to the rear of the box-casing and to the outer edge of the cutter-bar, substantially as and for the purpose described.

6. In a device for topping corn, a structure provided with cutters arranged at an elevation, means for driving said cutters, and a steering-wheel mounted to turn and to have vertical movement, a toggle-lever attached to the support for the steering-wheel, arms projected from the connection of the members of the toggle-lever, a shaft having cranks, the cranks being connected with the said arms projected from the toggle-lever, and a cable connection between the said cranks and a point near the lower end of the support for the steering-wheel, for the purpose set forth.

PAOLI BYRON HORNER.
CLARENCE ELLIOTT HEDRICK.

Witnesses:
E. S. GREEN,
JENNIE B. HAMILL.